J. B. BIRGH.
ROLLER BEARING.
APPLICATION FILED JUNE 7, 1920.
1,418,277. Patented June 6, 1922.
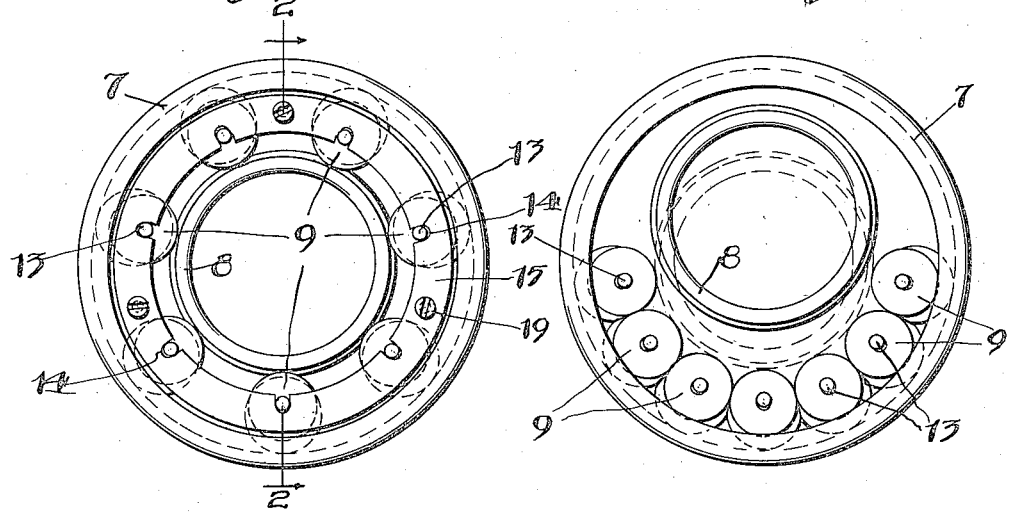
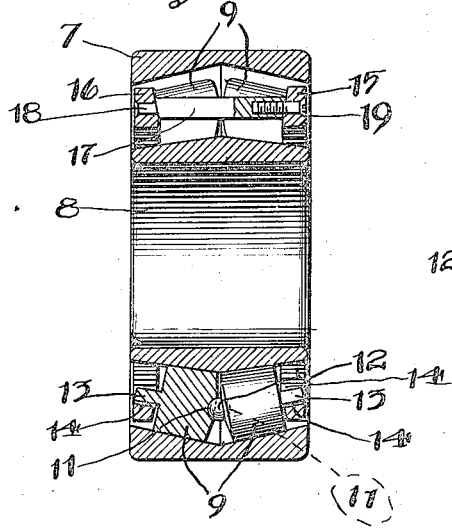
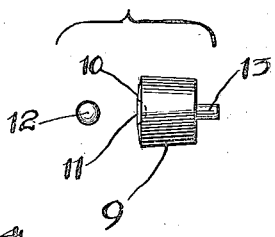
Inventor
John B. Birgh
By Chas. Tillman
Atty.
Witness
Geo. L. Laurence

UNITED STATES PATENT OFFICE.

JOHN B. BIRGH, OF CHICAGO, ILLINOIS.

ROLLER BEARING.

1,418,277.   Specification of Letters Patent.   Patented June 6, 1922.

Application filed June 7, 1920. Serial No. 387,166.

*To all whom it may concern:*

Be it known that I, JOHN B. BIRGH, a subject of the King of Sweden, residing at Chicago, in the county of Cook and State of Illinois, have invented certain new and useful Improvements in Roller Bearings, of which the following is a specification.

This invention relates to improvements in roller bearings, and it consists in certain peculiarities of the construction, novel arrangement, combination and operation of the various parts thereof as will be hereinafter more fully set forth and specifically claimed.

The principal object of the invention is to furnish a roller bearing, which shall be simple and inexpensive in construction, easily assembled, strong, durable and efficient in operation, with its parts so made, arranged and co-operating with one another, as to perform the functions of anti-friction roller bearings heretofore in general use, and in addition thereto afford means whereby load carrying rollers only are used in connection with the retaining rings or members thereof, the spacing rollers heretofore generally employed being dispensed with.

A further object is the provision of novel means for holding the rollers of the device in spaced relation both endwise and laterally with respect to one another.

Still another and important object of the invention is to provide means to take care of or carry side thrusts of the parts and to reduce to a minimum noise incident to the operation of the various parts of the bearing.

Still another object is to provide a bearing in which the rollers thereof will have uniform and simultaneous bodily as well as individual movements.

Other objects and advantages of the invention will be disclosed in the following description and explanation.

In the accompanying drawing, which serves to illustrate an embodiment of the invention—

Fig. 1 is a face view of the bearing showing the parts thereof in their operative positions.

Fig. 2 is a central sectional view taken on line 2—2 of Fig. 1 looking in the direction indicated by the arrows.

Fig. 3 is a side view of the bearing with the spacing rings for the rollers removed showing by continuous lines the position of the parts in the first step of assembling the same and by dotted lines the second or following step in said operation, and Fig. 4 is a view in side elevation of one of the rollers and one of the spacing balls therefor showing them in detached relation.

Like numerals of reference refer to corresponding parts throughout the different views of the drawing.

Referring to the drawing, the reference numeral 7 designates the outer retaining member or ring of the bearing, which may be made of any suitable size and material. This member is preferably made in the form of a ring, but if desired, it may have its outer portion of other shape than circular. The inner surface or periphery of the ring 7 is inclined from each of its edges towards the outer surface of the ring to a point about midway between the sides of the ring. The inner retaining member or ring of the bearing is indicated by the numeral 8 and may be made of any suitable size, but by preference of the same width as the outer ring 7 and is normally concentrically located in said outer ring but spaced therefrom. The inner ring 8 which may be suitably mounted on a journal or axle has its outer periphery inclined from each of the side edges thereof towards the outer ring as is clearly shown in Fig. 2 of the drawing, in which view it will be seen that while the inclined portions leading from the edges of the outer ring 7 and the corresponding portions of the inner ring 8 are inclined in the same direction, yet it will be understood that the inclinations of said parts are not located in parallel planes but are so disposed that the space between the coinciding inclined portions of the inner and outer rings are wider near the inner or middle portions or apexes of said inclined walls than at their outer ends.

By this arrangement an annular space having outwardly inclined and slightly contracted walls from its middle portion is provided, in which a plurality of anti-friction rollers 9 are located in spaced relation to one another in a pair of rows as will be readily understood by reference to Fig. 2 of the drawing. Each of these rollers by preference has its inner end slightly rounded or outwardly dished as at 10 and is provided centrally therein with a circular depression or recess 11 for the reception of a spacing ball 12 one of which balls is located in the depressions or recesses 11 in the inner ends of each pair of the rollers 9 as will be understood by reference to Fig. 2 of the drawing. Each of the rollers 9 is tapered from its inner portion or end to its outer end to correspond with the tapered space between the outer retaining ring 7 and inner retaining ring 8 between which the rollers are located. Each of the rollers 9 is provided centrally in its outer end with a stub shaft 13 for engagement with elongated recesses 14 provided in the inner periphery of a pair of keeper rings 15 and 16 which are of a size to fit between the outer retaining ring 7 and inner retaining ring 8, preferably, without contacting therewith as will be understood by reference to Figs. 1 and 2 of the drawing. The keeper rings 15 and 16 are united and held in spaced relation near the edges of the retaining rings 7 and 8 between which they are located by means of a number of rods 17 which are by preference secured by means of riveting them at one of their ends as at 18, see Fig. 2, to the keeper ring 16 and by securing the keeper ring 15 to the opposite ends of said rods by means of screws 19 extended through suitable transverse openings in the ring 15 and into screw-threaded openings in the ends of the rods 17 adjacent said ring. By this arrangement it is apparent that the keeper ring 15 is detachable for the purpose of assembling the rollers and also for the purpose of enabling a broken roller to be removed and replaced by a new one.

In order to assemble the parts of the bearing, the outer retaining member or ring 7 may be placed in about the position shown in Fig. 3 of the drawing when a plurality of the load carrying rollers 9 may be placed in a pair of rows on the inner surface of the said retaining member with a spacing ball 12 between the inner ends of each pair of the rollers in which position said balls will be retained by reason of the recesses 11 in the rollers in which said balls are located. The arrangement of the rollers in the first step of assembling the parts is shown in Fig. 3 of the drawing, in which view it will be seen and understood that the inner retaining ring or member 8 is then placed eccentrically within the outer retaining ring 7 as shown by continuous lines in said figure, when by causing the inner ring 8 to assume the dotted line position shown in Fig. 3, it is manifest that the rollers 9 can be moved between the inner and outer retaining members and properly spaced. When the rollers are thus arranged, the keeper ring 16 which carries the tie rods 17 extended from its inner surface can be placed between the retaining rings 7 and 8 at one of their edges in such a manner that the recesses 14 in the inner periphery of the ring 16 will receive the stub shafts 13 on the outer ends of the rollers 9 constituting the row of rollers adjacent said keeper ring.

In this operation it will be understood that the tie rods 17 will extend between the spaced rollers and present their free ends each of which is provided with a screw-threaded opening towards the opposite edges of the retaining rings or members 7 and 8 between which edges the keeper ring 15 can be placed in such a manner that the recesses 14 therein will receive the stub shafts 13 on the outer ends of the rollers 9 comprising the row of rollers adjacent the last named keeper ring. When the parts are thus positioned the keeper ring 15 may be secured to the tie rods 17 by means of the screws 19 in an obvious manner. When the parts are thus assembled it is apparent that by reason of the novel and peculiar construction of the adjacent surfaces of the inner and outer retaining members and of the rollers, side thrusts of the parts will be properly taken care of and that as the rollers 9 contact with or travel on the inclined adjacent surfaces of the inner and outer retaining members a noiseless, efficient and substantially frictionless bearing will be afforded in which the entire number of rollers will have a uniform movement as well as individual or independent movement.

It will be observed that the recesses 14 in the keeper rings 15 and 16 are located radially with respect to said members and are slightly elongated radially, thus preventing the stub shafts 13 of the rollers contacting with the walls of said recesses except at the sides thereof.

While I have shown the larger ends of the tapered rollers 9 provided with a recess in each end thereof for the reception of the spacing balls 12, yet these recesses and balls may be omitted, when it is apparent that the rounded ends of the rollers will contact with one another in the operation of the device.

Having thus fully described my invention, what I claim as new and desire to secure by Letters Patent is—

1. In a roller bearing, the combination of a single piece outer retaining member having its inner periphery outwardly inclined from its edges, of a plurality of oppositely tapered rollers located on the inclined surfaces of said member in pairs with their larger ends facing each other and grouped together laterally, and a single piece inner retaining member adapted to be inserted eccentrically into the said outer member and then placed in concentric relation to said outer member for the purpose of permitting the rollers to be placed around the inner member.

2. In a roller bearing, the combination of a single piece outer retaining member having its inner periphery outwardly inclined from its edges, of a plurality of oppositely tapered rollers located on the inclined surfaces of said member in pairs with their larger ends facing each other and grouped together laterally, a single piece inner retaining member adapted to be inserted eccentrically into the said outer member and then placed in concentric relation to said outer member for the purpose of permitting the rollers to be placed in spaced relation around the inner member, and means interposed between the rollers for holding them in spaced relation to one another.

JOHN B. BIRGH.